UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

NEW DISAZO DYE.

No. 897,529.

Specification of Letters Patent.

Patented Sept. 1, 1908.

Application filed February 19, 1908. Serial No. 416,782.

*To all whom it may concern:*

Be it known that we, OSCAR GÜNTHER and LEOPOLD HESSE, doctors of philosophy, chemists, citizens of the German Empire, residing at Elberfeld, Germany, Kingdom of Prussia, have invented new and useful Improvements in New Disazo Coloring-Matter, of which the following is a specification.

This invention relates to the manufacture and production of new disazo dyestuffs dyeing cotton from violet to blue shades remarkable for their fastness to light. They are obtained by first producing intermediate compounds from the diazo compounds of the sulfurous acid ester of 1.8-aminonaphthol with suitable amins to produce intermediate compounds which can be further diazotized, eliminating the sulfurous acid residue from these intermediate compounds, diazotizing them and combining the thus produced diazoazo compounds with derivatives of 2-amino-5-naphthol-7-sulfonic acid.

The new dyestuffs are in the shape of their alkaline salts dark powders easily soluble in water. Upon reduction with stannous chlorid and hydrochloric acid the dyestuffs are decomposed 1.8-aminonaphthol, a diamin and derivatives of 2.6-diamino-5-naphthol-7-sulfonic acid are formed.

In order to carry out this process we can *e. g.* proceed as follows, the parts being by weight: 223 parts of the sulfurous acid ester of 1.8-aminonaphthol are dissolved in water and 125 parts of concentrated hydrochloric acid are added thereto. The sulfurous acid ester is then diazotized with 69 parts of sodium nitrite at 0° C. and the diazo compound is added to an aqueous solution of 187.5 parts of the hydrochlorid of cresidin ($CH_3 : NH_2 : OC_2H_5—1:3:4$). 170 parts of crystallized sodium acetate are gradually introduced into the mixture. The product of the reaction is acidulated with hydrochloric acid and the intermediate compound is precipitated by the addition of common salt. From the resulting azo dyestuff the sulfurous acid residue is eliminated by dissolving the ester in an excess of caustic soda and by boiling the solution for some time. The product of the reaction is acidulated with hydrochloric acid, filtered off, stirred up with water and the aminoazo compound is after cooling diazotized with 69 parts of sodium nitrate. The diazo compound is then introduced into a solution of 319 parts of 2-amino-5-naphthol-1.7-disulfonic acid to which sufficient sodium carbonate has been added to maintain the mixture alkaline even after the whole of the diazo compound has been added. The dyestuff is salted out, pressed and dried. It is, after being dried and pulverized, in the shape of its sodium salt a dark powder which is soluble in water with a violet color and which is soluble in concentrated sulfuric acid with a blue color. By reducing with stannous chlorid and hydrochloric acid 1.8-aminonaphthol, 1-methyl-2.5-diamino-4-ethoxybenzene and 2.6-diamino-5-naphthol-1.7-disulfonic acid are obtained. The new dyestuff dyes cotton reddish-blue shades.

The above described process is carried out in an analogous manner on using other suitable amins to produce the intermediate compounds capable of being diazotized, such as alpha-naphthylamin, para-xylidin, meta-toluidin, acetylamino-ortho-toluidin, 1-naphthylamin-6-or 7-sulfonic acid, para-acetylamino-ortho-anisidin etc. or other of the above mentioned components to produce the final result, such as 2-diethylamino-5-naphthol-7-sulfonic acid, 2-phenylamino-5-naphthol-7-sulfonic acid, 2-paratolylamino-5-naphthol-7-sulfonic acid, 2-benzoylamino-5-naphthol-7-sulfonic acid, 2-ethylamino-5-naphthol-7-sulfonic acid, carbonyl-1.2-diamino-5-naphthol-7-sulfonic acid, etc.

Having now described our invention and in what manner the same is to be performed, what we claim as new and desire to secure by Letters Patent is:—

1. The herein described new azo-dyestuffs obtainable from sulfurous acid ester of 1.8-aminonaphthol, amins and with derivatives of 2-amino-5-naphthol-7-sulfonic acid, which dyestuffs are, after being dried and pulverized, in the shape of their alkaline salts dark powders soluble in water, soluble in concentrated sulfuric acid with from a red to violet to blue color; yielding upon reduction with stannous chlorid and hydrochloric acid 1.8-aminonaphthol, a diamin and a derivative of 2.6-diamino 5-naphthol-7-sulfonic acid; and dyeing cotton from violet to blue shades, substantially as hereinbefore described.

2. The herein described new azo-dyestuff obtainable from sulfurous acid ester of 1.8-aminonaphthol, cresidin and with 2-amino-5- naphthol-1.7-disulfonic acid, which dyestuff is, after being dried and pulverized, in the shape of its sodium salt a dark powder which is soluble in water with a violet color and which is soluble in concentrated sulfuric acid with a blue color; yielding upon reduction with stannous chlorid and hydrochloric acid 1.8-aminonaphthol, 1-methyl-2.5-diamino-4-ethoxybenzene and 2.6-diamino-5-naphthol-1.7-disulfonic acid; and dyeing cotton red- dish-blue shades, substantially as hereinbefore described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
WM. WASHINGTON BRUNSWICK.

---

Correction in Letters Patent No. 897,529.

It is hereby certified that in Letters Patent No. 897,529, granted September 1, 1908, upon the application of Oscar Günther and Leopold Hesse, of Elberfeld, Germany, for an improvement in "New Disazo Dyes," an error appears in the printed specification requiring correction, as follows: In line 54, page 1, the word "nitrate" should read *nitrite;* and that the said Letters Patent should be read with this correction therein that the same may conform to the record of the case in the Patent Office.

Signed and sealed this 8th day of December, A. D., 1908.

[SEAL.]

C. C. BILLINGS,
*Acting Commissioner of Patents.* naphthol-1.7-disulfonic acid, which dyestuff is, after being dried and pulverized, in the shape of its sodium salt a dark powder which is soluble in water with a violet color and which is soluble in concentrated sulfuric acid with a blue color; yielding upon reduction with stannous chlorid and hydrochloric acid 1.8-aminonaphthol, 1-methyl-2.5-diamino-4-ethoxybenzene and 2.6-diamino-5-naphthol-1.7-disulfonic acid; and dyeing cotton reddish-blue shades, substantially as hereinbefore described.

In testimony whereof we have hereunto set our hands in the presence of two subscribing witnesses.

OSCAR GÜNTHER. [L. S.]
LEOPOLD HESSE. [L. S.]

Witnesses:
OTTO KÖNIG,
WM. WASHINGTON BRUNSWICK.

---

Correction in Letters Patent No. 897,529.

It is hereby certified that in Letters Patent No. 897,529, granted September 1, 1908, upon the application of Oscar Günther and Leopold Hesse, of Elberfeld, Germany, for an improvement in "New Disazo Dyes," an error appears in the printed specification requiring correction, as follows: In line 54, page 1, the word "nitrate" should read *nitrite;* and that the said Letters Patent should be read with this correction therein that the same may conform to the record of the case in the Patent Office.

Signed and sealed this 8th day of December, A. D., 1908.

[SEAL.]

C. C. BILLINGS,
*Acting Commissioner of Patents.*

Correction in Letters Patent No. 897,529

It is hereby certified that in Letters Patent No. 897,529, granted September 1, 1908, upon the application of Oscar Günther and Leopold Hesse, of Elberfeld, Germany, for an improvement in "New Disazo Dyes," an error appears in the printed specification requiring correction, as follows: In line 54, page 1, the word "nitrate" should read *nitrite;* and that the said Letters Patent should be read with this correction therein that the same may conform to the record of the case in the Patent Office.

Signed and sealed this 8th day of December, A. D., 1908.

[SEAL.]

C. C. BILLINGS,
*Acting Commissioner of Patents.*